US008362718B2

(12) United States Patent
Hubmann et al.

(10) Patent No.: US 8,362,718 B2
(45) Date of Patent: Jan. 29, 2013

(54) DEVICE AND METHOD FOR OPERATING A CLOSING PART, DRIVEN BY A DRIVE, ON A DEVICE OF TRANSPORTATION

(75) Inventors: Michael Hubmann, Bad Rappenau (DE); Thomas Ohl, Friolzheim (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 294 days.

(21) Appl. No.: 12/814,021

(22) Filed: Jun. 11, 2010

(65) Prior Publication Data

US 2011/0010993 A1 Jan. 20, 2011

(30) Foreign Application Priority Data

Jul. 14, 2009 (DE) ......................... 10 2009 032 956

(51) Int. Cl.
*G05D 1/02* (2006.01)

(52) U.S. Cl. ........................... 318/16; 318/269; 318/293

(58) Field of Classification Search .................. 318/269, 318/16, 293, 480

See application file for complete search history.

(56) References Cited

U.S. PATENT DOCUMENTS 4,411,448 A * 10/1983 Takada .......................... 280/802
4,598,237 A * 7/1986 Wada et al. ..................... 318/16
2009/0211156 A1 8/2009 Appel

FOREIGN PATENT DOCUMENTS

DE 102006057889 A1 6/2008
DE 10 2008 014 514 A1 10/2008
DE 102009047114 A1 8/2010
JP 2006152685 A 6/2006
JP 2006158009 A 6/2006
JP 2007255092 A 10/2007
JP 2008524479 A 7/2008

* cited by examiner

*Primary Examiner* — Karen Masih

(74) *Attorney, Agent, or Firm* — Leydig, Voit & Mayer, Ltd.

(57) ABSTRACT

A device for operating a closing part, driven by a drive, on a device of transportation contains a control apparatus which is assigned to the drive and is configured to actuate the drive in order to initiate a measure which is opposed to the movement of the closing part. The drive is embodied as an electric or electromechanical drive. The drive can be actuated by the control apparatus in such a way that the drive becomes active in a braking fashion with respect to the movement of the closing part.

10 Claims, 2 Drawing Sheets

DEVICE AND METHOD FOR OPERATING A CLOSING PART, DRIVEN BY A DRIVE, ON A DEVICE OF TRANSPORTATION

CROSS-REFERENCE TO RELATED APPLICATION

This application claims the priority, under 35 U.S.C. §119, of German application DE 10 2009 032 956.0, filed Jul. 14, 2009; the prior application is herewith incorporated by reference in its entirety.

BACKGROUND OF THE INVENTION

Field of the Invention

The invention relates to a device for operating a closing part, driven by a drive, on a device of transportation. The device has a control apparatus which is assigned to the drive and is configured to actuate the drive in order to initiate a measure which is opposed to the movement of the closing part. The invention also relates to a method for operating a closing part, driven by the drive, on the device of transportation.

Published, non-prosecuted German patent application DE 10 2008 014 514 A1 discloses a method for operating a tailgate, which can be pivoted between two end positions by a hydraulic drive apparatus, of a vehicle. In order to prevent persons being put at risk by incorrect closure of the tailgate, during a period of interruption a control signal is generated which activates the drive apparatus to output a counter-pulse which counteracts a downward movement of the tailgate.

SUMMARY OF THE INVENTION

It is accordingly an object of the invention to provide a device and a method for operating a closing part on a device of transportation, driven by a drive, which overcome the above-mentioned disadvantages of the prior art methods and devices of this general type, in which a braking operation of a movement of the closing part is to be implemented with the lowest possible expenditure.

The device for operating the closing part, driven by a drive, on a device of transportation includes a control apparatus which is assigned to the drive. The control apparatus is configured to actuate the drive in order to initiate a measure which is opposed to the movement of the closing part. The drive is embodied as an electric or electromechanical drive. In this context, the drive can be actuated by the control apparatus in such a way that the drive becomes active in a braking fashion with respect to the movement of the closing part. The term “closing part” includes, in the wording of this text, in particular vehicle components such as, for example, a tailgate, an engine hood, a side door or a lift and slide sunroof, to name a selection.

In one embodiment variant of the invention, the device contains a short-circuit-generating device with which a short-circuit can be generated at the drive and/or at an electrical component which is operatively connected to the drive. The short-circuit ultimately gives rise to braking effectiveness of the drive. The short-circuit-generating device is structurally simple to construct and therefore constitutes an effective possible way of generating the braking effect. In terms of the implementation of an effect of the motor which brings about braking with respect to the movement of the closing part, other only conceivable solutions are also basically possible.

According to one embodiment of the invention, the short-circuit can be generated between the terminals of the drive (that is to say between the motor terminals) with the short-circuit-generating device.

In one embodiment variant of the invention, the control apparatus is assigned a decision device. The decision device decides, on the basis of predefined decision criteria, whether the drive will become active in a braking fashion. In this context, when there is a positive decision result, the control apparatus causes the drive to become active in a braking fashion with respect to the movement of the closing part. This makes it possible to provide comfortable and reliable operation of the device by use of situationally appropriate decisions.

In one embodiment of the invention, the device is assigned a sensor system for detecting the spatial position and/or the direction of movement of the closing part and a plausibility-checking device. The plausibility-checking device is used to check the plausibility and/or consistency of output signals which are supplied by the sensor system. The decision as to whether the drive becomes active in a braking fashion is taken with consideration of the plausibility-checking result.

In one embodiment variant of the invention, the control apparatus is configured to actuate the drive in dependence on a setpoint movement sequence plan which is stored in the control unit. The device is assigned a determining apparatus which is configured to determine a deviation of the actual movement sequence of the closing part from the setpoint movement sequence of the closing part. The control apparatus is configured to cause the drive to become active in a braking fashion with respect to the movement of the closing part when the deviation of the actual movement sequence of the closing part from the setpoint movement sequence of the closing part is determined. The deviation of the actual movement from the setpoint movement sequence is often due to an unintended movement of the closing part. Such an unintended movement can be caused by changed kinematic relationships which occur, for example, at the side door when the vehicle assumes an oblique position. Overall, the embodiment variant described last reduces the endangerment of persons which is associated with an unintended movement.

In one embodiment of the invention, the device has a warning apparatus with which an acoustic and/or optical and/or haptic warning signal can be output after the decision that the drive will become active in a braking fashion as a further safety precaution for protecting persons.

A significant advantage of the invention is the double use of an electric or electromechanical drive which is necessary in any case in the driving function, which constitutes a particularly effective possible way of implementing activation of the counter-pulse which counteracts the movement of the closing part.

Other features which are considered as characteristic for the invention are set forth in the appended claims.

Although the invention is illustrated and described herein as embodied in a device and a method for operating a closing part, driven by a drive, on a device of transportation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
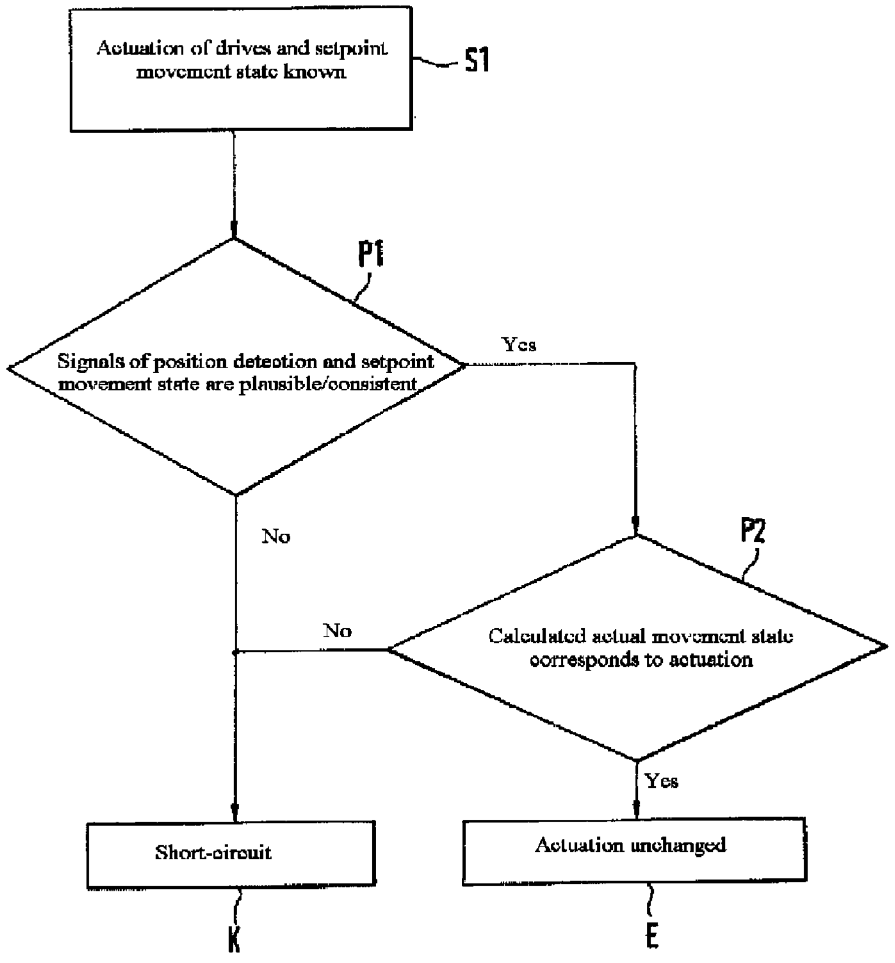
FIG. 1 is a flowchart of a method according to the invention for operating a tailgate which is provided on a motor vehicle.
Figure 2:
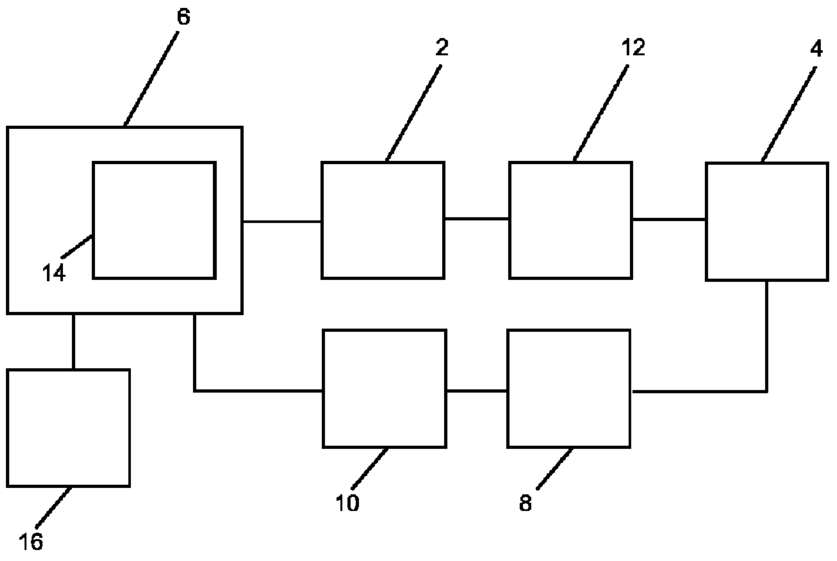
FIG. 2 schematically shows a device for carrying out the method of FIG. 1.

The method is carried out with a device schematically illustrated in FIG. 2, which contains the components which are described individually below:

a) an electromechanical drive 2 for driving the tailgate 4;

b) a control apparatus 6 in which a setpoint movement sequence plan according to which the control apparatus actuates the drive in order to implement a setpoint movement sequence of the tailgate is stored;

c) a sensor system 8 for detecting the spatial position and/or the direction of movement of the closing part;

d) a plausibility-checking device 10 which is configured to check the plausibility and/or consistency of the output signals which are supplied by the specified sensor system; and e) a short-circuit-generating apparatus 12 with which a short-circuit can be generated between the terminals of the drive.

In one embodiment variant of the invention, the control apparatus is assigned a decision device 14. The decision device decides, on the basis of predefined decision criteria, whether the drive will become active in a braking fashion. In this context, when there is a positive decision result, the control apparatus causes the drive to become active in a braking fashion with respect to the movement of the closing part. This makes it possible to provide comfortable and reliable operation of the device by use of situationally appropriate decisions.

In one embodiment of the invention, the device has a warning apparatus 16 with which an acoustic and/or optical and/or haptic warning signal can he output after the decision that the drive will become active in a braking fashion as a further safety precaution for protecting persons.

The method firstly includes a determining step S1 in which data which relate to the setpoint movement sequence plan are stored and made available for later processing and/or evaluation in a data memory.

After the determining step S1, the method is continued in a first checking step P1 in which the plausibility-checking device is used to check the plausibility and/or consistency of output signals which are supplied by the sensor system.

If a positive plausibility-checking result is achieved in the checking step P1, the method is continued with a second checking step P2. In contrast, if a negative plausibility-checking result is achieved in the checking step P1, the method is continued with a short-circuit-generating step K.

In the short-circuit-generating step K, a short-circuit which brings about, or results in, the induction of an opposing force (Lorentz force) in the drive is generated between the terminals of the drive (that is to say between the motor terminals). This opposing force ultimately causes the movement of the tailgate to be slowed down.

In the second checking step P2 it is checked whether a deviation of the actual movement sequence of the tailgate from the setpoint movement sequence of the tailgate has occurred. If a positive checking result is achieved in the second checking step P2, the method is continued in the decision step E in which it is decided that the actuation of the drive remains unchanged.

However, if a negative checking result is achieved in the second checking step P2, the method is continued with the short-circuit-generating step K.

Of course, the method according to the invention is used in particular for monitoring an unintended movement of the tailgate, of a side door or of any other closing part in the direction of closing thereof because here there is the risk of a person's body part being trapped.

"Direction of closing" is to be understood in the wording of this text as meaning the direction of movement of the closing part in which the latter is moved out of an open position, in which the closing part at least partially clears an opening, in order to close the opening.

The invention claimed is:

1. A device for operating a closing part, driven by a drive, on a device of transportation, the device comprising:

a control apparatus associated with the drive and configured to actuate the drive to initiate a measure which is opposed to a movement of the closing part, the drive being selected from the group consisting of an electric drive and an electromechanical drive, the drive being actuated by said control apparatus such that the drive becomes active in a braking fashion with respect to the movement of the closing part;

a decision device assigned to the control apparatus, which decides, on a basis of predefined decision criteria, whether the drive will become active in a braking fashion;

a sensor system for detecting at least one of a spatial position and a direction of movement of the closing part; and a plausibility-checking device for checking a plausibility of output signals supplied by said sensor system, and a decision as to whether the drive will become active in a braking fashion being taken with consideration of a plausibility-checking result.

2. The device according to claim 1, further comprising a short-circuit-generating device with which a short-circuit, which ultimately gives rise to a braking effectiveness of the drive, can be generated at the drive.

3. The device according to claim 2, wherein the short-circuit can be generated between terminals of the drive.

4. The device according to claim 1, wherein said control apparatus is configured to actuate the drive in dependence on a setpoint movement sequence plan which is stored in said control apparatus;

further comprising a determining apparatus configured to determine a deviation of an actual movement sequence of the closing part from a setpoint movement sequence; and wherein said control apparatus is configured to cause the drive to become active in a braking fashion when the deviation is determined.

5. The device according to claim 1, further comprising a warning apparatus with which a warning signal can be output after a decision that the drive will become active in a braking fashion.

6. A method for operating a closing part, driven by a drive, on a device of transportation, providing a device having a control apparatus which is assigned to the drive and is configured to actuate the drive to initiate a measure which is opposed to a movement of the closing part, and the drive is selected from the group consisting of an electric drive and an electromechanical drive, the control apparatus has a decision device which decides, on a basis of predefined decision criteria, whether the drive will become active in a braking fashion;

actuating the drive via the control apparatus such that the drive becomes active in a braking fashion with respect to the movement of the closing part;

making available a sensor system for detecting at least one of a spatial position and a direction of movement of the closing part; and providing a plausibility-checking device used for checking a plausibility of output signals which are supplied by the sensor system, and the decision as to whether the drive will become active in a braking fashion being taken with consideration of a plausibility-checking result.

7. The method according to claim 6, which further comprises providing a short-circuit-generating device with which a short-circuit, which ultimately brings about a braking effectiveness of the drive, is generated at the drive.

8. The method according to claim 7, which further comprises generating the short-circuit between terminals of the drive.

9. The method according to claim 6, which further comprises:

configuring the control apparatus to actuate the drive in dependence on a setpoint movement sequence plan which is stored in the control unit;

providing the device with a determining apparatus configured to determine a deviation of an actual movement sequence of the closing pan from the setpoint movement sequence; and configuring the control apparatus to cause the drive to become active in a braking fashion when the deviation is determined with respect to the movement of the closing part.

10. The method according to claim 6, wherein the device has a warning apparatus with which a warning signal is output after the decision that the drive will become active in a braking fashion.

* * * * *